United States Patent
Cho et al.

(10) Patent No.: US 8,045,064 B2
(45) Date of Patent: Oct. 25, 2011

(54) CONTRAST CONTROL APPARATUS AND METHOD

(75) Inventors: Hwa-Hyun Cho, Seoul (KR);
Jong-Seon Kim, Seongnam-si (KR);
Bom-Yun Kim, Seoul (KR)

(73) Assignee: Samsung Electronics Co., Ltd.,
Suwon-si, Gyeonggi-do (KR)

( * ) Notice: Subject to any disclaimer, the term of this patent is extended or adjusted under 35 U.S.C. 154(b) by 1125 days.

(21) Appl. No.: 11/782,712

(22) Filed: Jul. 25, 2007

(65) Prior Publication Data

US 2008/0030622 A1    Feb. 7, 2008

(30) Foreign Application Priority Data

Aug. 4, 2006   (KR) .................. 10-2006-0073863

(51) Int. Cl.
*H04N 5/57*   (2006.01)
(52) U.S. Cl. ........................ 348/673; 348/678
(58) Field of Classification Search .................. 348/673, 348/678, 679, 686, 229.1, 255–257, 365; 345/617; 382/274; *H04N 5/14, 5/52, 5/57*
See application file for complete search history.

(56) References Cited

U.S. PATENT DOCUMENTS 5,496,106 A * 3/1996 Anderson ..................... 348/678
7,102,697 B2 * 9/2006 Lei et al. ....................... 348/678

FOREIGN PATENT DOCUMENTS

| KR | 100200630 B1 | 3/1999 |
| KR | 1020050116609 A | 12/2005 |
| KR | 1020060004218 A | 1/2006 |
| WO | 2004/064388 A1 | 7/2004 |

* cited by examiner

*Primary Examiner* — Sherrie Hsia
(74) *Attorney, Agent, or Firm* — Volentine & Whitt, PLLC

(57) ABSTRACT

A contrast control apparatus includes a memory for storing input image signals within one frame and an image reducing unit for selecting at least one image signal of the input image signals. An accumulation value calculating unit calculates accumulation values for predetermined sampling gray values with respect to the selected image signal. An image characteristic decision unit determines at least one characteristic of the selected image based on the accumulation values. A contrast control function calculating unit calculates a contrast control function based on the characteristic of the selected image. A contrast controller controls contrast of the image signals stored in the memory according to the contrast control function.

31 Claims, 8 Drawing Sheets

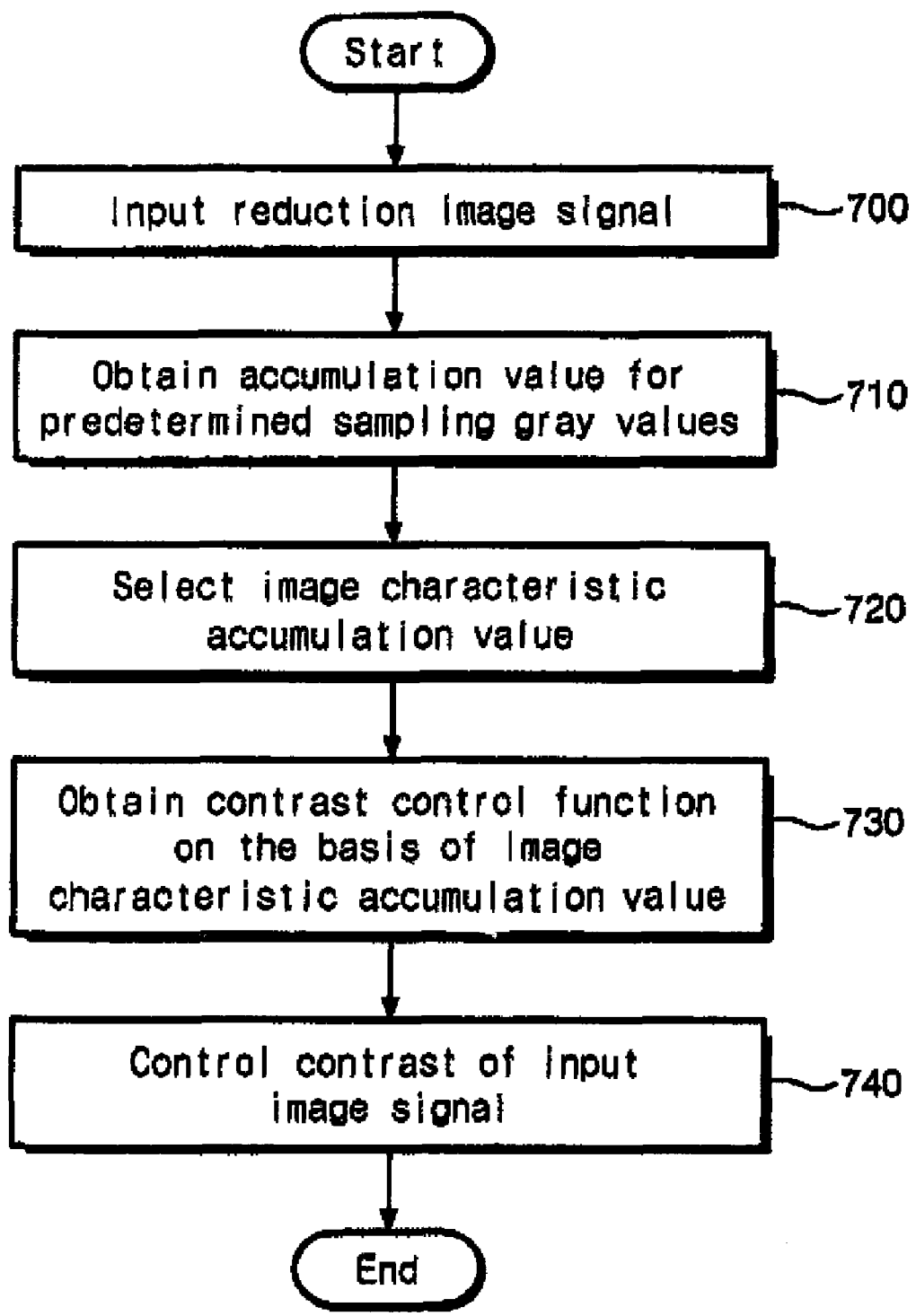

CONTRAST CONTROL APPARATUS AND METHOD

CROSS-REFERENCE TO RELATED APPLICATIONS

A claim of priority is made to Korean Patent Application No. 10-2006-0073863, filed on Aug. 4, 2006, the subject matter of which is hereby incorporated by reference.

BACKGROUND OF THE INVENTION

1. Field of the Invention

The present invention relates to an image processing apparatus and method, and more particularly, to an apparatus and method for controlling contrast of an image signal.

2. Description of the Related Art

A variety of flat display panels, such as liquid crystal displays and plasma display panels, are widely used with recently developed electronic technology. In these flat display panels, a driving circuit applies image signals to data lines, while it sequentially drives multiple scan lines of the flat display panel to display a predetermined image. The driving circuit controls contrast of the image signals to optimize the image displayed on the flat display panel.

Examples of methods of controlling contrast of image signals include a look-up table method, a histogram sliding method and a contrast stretching method.

The look-up table method uses image signals corresponding to respective pixels as indices of arrangement, stores output image signals corresponding to input image signals in a look-up table, and outputs output signals corresponding to predetermined input image signals, thereby controlling contrast. The look-up table method requires a process of calculating an output image for each image signal in order to make a look-up table in advance, and requires a memory for storing the look-up table. Also, since the look-up table method controls contrast for a next image signal using a previous image signal, the look-up table method is difficult to apply to an image signal having a variety of changes.

The histogram sliding method obtains a histogram that has measured the number of pixels having a predetermined value on the basis of input image signals, and applies a predetermined weight on the input image signals to extend or reduce the histogram, thereby controlling contrast. However, because histogram distribution varies for each input image signal, there is a high possibility that underflow and overflow will occur. Therefore, a separate clamping circuit for preventing the underflow and overflow is required.

The contrast stretching method is suitable for projection of intermediate brightness. The contrast stretching method measures the number of pixels having the same value from input image signals to obtain a histogram, and subtracts a lowest pixel value from a current pixel value to determine weight. However, because the contrast stretching method includes a multiplier and an accumulator having a complicated structure, the contrast stretching method is difficult to apply, particularly where image signals are displayed in real-time. Also, the contrast stretching method is not suitable for processing image signals distributed on a region having high or low contrast.

SUMMARY OF THE INVENTION

An aspect of the present invention provides a contrast control apparatus having a memory, an image reducing unit, an accumulation value calculating unit, an image characteristic decision unit, a contrast control function calculating unit and a contrast control unit. The memory stores input image signals within one frame. The image reducing unit selects at least one image signal of the input image signals. The accumulation value calculating unit calculates accumulation values for predetermined sampling gray values with respect to the selected image signal. The image characteristic decision unit determines at least one characteristic of the selected image based on the accumulation values. The contrast control function calculating unit calculates a contrast control function based on the at least one determined characteristic of the selected image. The contrast controller controls contrast of the image signals stored in the memory according to the contrast control function.

The image reducing unit may include a vertical selector for selecting image signals of the input image signals in a vertical direction, corresponding to a vertical reduction ratio, as first reduction image signals. The image reducing unit may also include a horizontal selector for selecting image signals output from the vertical selector in a horizontal direction, corresponding to a horizontal reduction ratio, as second reduction signals. The vertical selector may include a first counter, operating in synchronization with a vertical synchronization signal, which outputs the first reduction image signals when a count value of the first counter is a multiple of the vertical reduction ratio. Likewise, the horizontal selector may include a second counter, operating in synchronization with a horizontal synchronization signal, which outputs second reduction image signals when a count value of the second counter is a multiple of the horizontal reduction ratio.

The accumulation value calculating unit may include comparators that receive reference signals, such that each comparator compares the reference signals with the at least one image signal and outputs a comparison signal. The accumulation value calculating unit may also include counters corresponding to the comparators, such that each counter operates in response to the comparison signal from the corresponding comparator, and outputs an accumulation value. Each reference signal may be a sampling gray value. Also, each of the counters may perform a counting operation when the comparison signal output from the corresponding comparator is a first level.

The image characteristic decision unit may determine an image characteristic accumulation value by identifying a largest difference between adjacent accumulation values output from the corresponding counters. The image characteristic decision unit may include a density calculator for calculating differences between adjacent accumulation values output from the counters, and a maximum value decision part for outputting a maximum accumulation value corresponding to a largest difference among the differences between adjacent accumulation values as an image characteristic accumulation value.

The contrast control function calculator may calculate a contrast control function, which approximates a reference function, based on the image characteristic accumulation value. The reference function may include a reference accumulation value change function with respect to a gray change for displaying an optimum image. The contrast control function calculator unit may add or subtract a compensation value to or from each accumulation value to calculate controlled accumulation values, and may calculate the contrast control function based on the controlled accumulation values. The contrast control function calculator may subtract the compensation value from the accumulation value when the accumulation value corresponding to the sampling gray value is greater than the reference accumulation value corresponding to the sampling gray value, and may add the compensation value to the accumulation when the accumulation value corresponding to the sampling gray value is less than the reference accumulation value corresponding to the sampling gray value.

The compensation value may be proportional to a difference between the image characteristic accumulation value and a reference accumulation value corresponding to the image characteristic accumulation value. Also, the compensation value may include a product of a proportional constant and a difference between the image characteristic accumulation value and a reference accumulation value corresponding to the image characteristic accumulation value. The proportional constant may be a number greater than 0 and less than 1.

The contrast control function f'(x) may be provided by the equation: $f'(x)=\alpha_{k'}(x-REF_k)+CV_{k'}$ where $\alpha_{k'}$ is a slope, x is an input image signal, k is one of 1, 2, 3, . . . , l, when the total number of the sampling gray values is l. $CV_{k'}$ is a controlled accumulation value, and $REF_k$ is a sampling gray value, where $REF_K \leq x \leq REF_{k+1}$. The slope $\alpha_{k'}$ may be provided by the following equation, in which the controlled accumulation values $CV_{k'}$ are calculated by adding/subtracting a compensation value W to/from accumulation values $CV_k$:

$$\alpha_{k'} = \frac{CV_{k'} - CV_{k-1'}}{REF_k - REF_{k-1}}$$

The contrast control function calculator may subtract the compensation value from the accumulation value when the accumulation value corresponding to the sampling gray value is greater than the reference accumulation value corresponding to the sampling gray value. The contrast control function calculator may add the compensation value to the accumulation value when the accumulation value corresponding to the sampling gray value is less than the reference accumulation value corresponding to the sampling gray value.

Another aspect of the present invention provides a method for controlling contrast of an image. The method includes selecting image signals within one frame of the image to provide reduction image signals; calculating accumulation values corresponding to sampling gray values set in advance with respect to the reduction image signals; determining characteristics of the image signals based on the accumulation values and selecting an image characteristic accumulation value; and calculating a contrast control function based on the selected image characteristic accumulation value. The contrast of all image signals is controlled within the one frame according to the contrast control function.

Selecting the image signals within one frame may include selecting image signals at predetermined positions within the one frame as the reduction image signals. Also, providing the reduction image signals may include selecting at least one image signal within the one frame corresponding to a vertical reduction ratio as first reduction image signals, and selecting the first reduction image signals corresponding to a horizontal reduction ratio as second reduction signals. Also, selecting the image characteristic accumulation value may include selecting an accumulation value of the calculated accumulation values that has a largest difference between an adjacent accumulation value. Calculating the contrast control function includes approximating a reference function based on the image characteristic accumulation value. The reference function may include a reference accumulation value change function with respect to a gray change for displaying an optimum image.

BRIEF DESCRIPTION OF THE DRAWINGS

The embodiments of the present invention will be described with reference to the attached drawings, in which:

FIG. 7 is a flowchart illustrating a method of controlling contrast, according to an exemplary embodiment of the present invention.

DETAILED DESCRIPTION OF THE EMBODIMENTS

Figure 1:
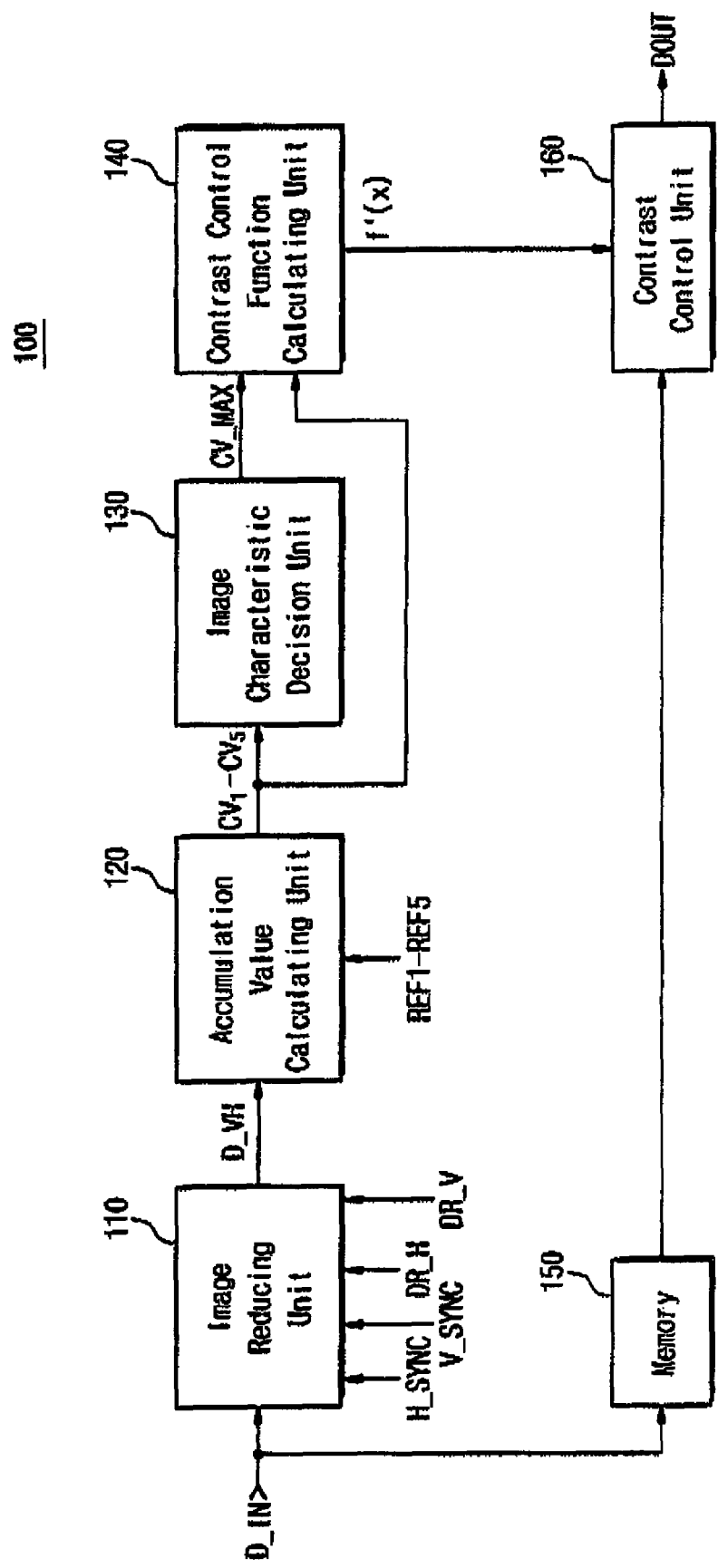
FIG. 1 is a block diagram illustrating a contrast control apparatus, according to an exemplary embodiment of the present invention.

The present invention will now be described more fully with reference to the accompanying drawings, in which exemplary embodiments of the invention are shown. The invention, however, may be embodied in various different forms, and should not be construed as being limited only to the illustrated embodiments. Rather, these embodiments are provided as examples, to convey the concept of the invention to one skilled in the art. Accordingly, known processes, elements, and techniques are not described with respect to some of the embodiments of the present invention. Throughout the drawings and written description, like reference numerals will be used to refer to like or similar elements.

FIG. 1 is a block diagram of a contrast control apparatus 100, according to an exemplary embodiment of the present invention. Referring to FIG. 1, the contrast control apparatus 100 includes an image reducing unit 110, an accumulation value calculating unit 120, an image characteristic decision unit 130, a contrast control function calculating unit 140, a memory 150 and a contrast control unit 160.

The image reducing unit 110 receives image signals D_IN, for example, from an outside source. The image reducing unit 110 selects some (at least one) of the image signals D_IN within one frame, and outputs the selected image signals as reduction image signals D_VH to the accumulation value calculating unit 120. Image signals may be selected at predetermined positions within the frame to be the reduction image signals.

The accumulation value calculating unit 120 obtains accumulation values $CV_1$-$CV_5$ corresponding to sampling gray values, which are reference values $REF_1$-$REF_5$ set in advance, of the selected reduction image signals output from the image reducing unit 110. The image characteristic decision unit 130 determines a representative characteristic of the one frame, such as which of bright color, mid-tone color and dark color images are primarily included. The contrast control function calculating unit 140 calculates a contrast control function f'(x), considering the image characteristics. The memory 150 stores the image signals D_IN of the input frame. The contrast control unit 160 controls contrast of the image signals D_IN stored in the memory 150 according to the contrast control function f'(x) obtained by the contrast control function calculating unit 140.

Generally, the contrast control apparatus 100 extracts some of the image signals D_IN within one frame as samples, decides characteristics of the corresponding image using the extracted sample image signals D_VH, and calculates the contrast control function f'(x) on the basis of these image characteristics. The contrast control apparatus 100 can improve image quality by controlling contrast of the input image signals D_IN according to the calculated contrast control function f'(x). Since some of image signals D_IN within one frame are extracted as samples to calculate a contrast control function f'(x), the construction of the contrast control apparatus 100 is simple, thus increasing processing speed.

Figure 2:
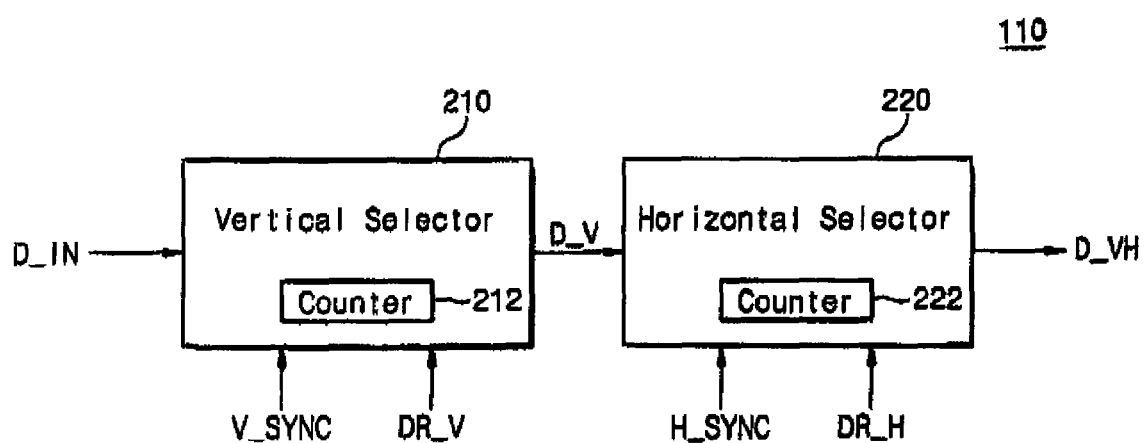
FIG. 2 is a block diagram illustrating an image reducing unit of the contrast control apparatus illustrated in FIG. 1.

FIG. 2 is a block diagram illustrating a more detailed construction of the image reducing 110 unit illustrated in FIG. 1. Referring to FIG. 2, the image reducing unit 110 includes a vertical selector 210 and a horizontal selector 220. The vertical selector 210 includes a counter 212, and selects some (at least one) of the input image signals D_IN in a vertical direction to obtain first reduction image signals D_V. The vertical selector 210 outputs the first reduction image signals D_V in response to a vertical synchronization signal V_SYNC and in accordance with a vertical reduction ratio DR_V.

The horizontal selector 220 includes a counter 222, and selects some (at least one) of the first reduction image signals D_V, output from the vertical selector 210, in a horizontal direction. In an embodiment, the horizontal selector 220 may select all of the first reduction image signals D_V. The horizontal selector 220 outputs second reduction image signals D_VH in response to a horizontal synchronization signal H_SYNC and in accordance with a horizontal reduction ratio DR_H. The second reduction image signals D_VH output from the horizontal selector 220 are image signals reduced in the vertical and horizontal directions.

Figure 3:
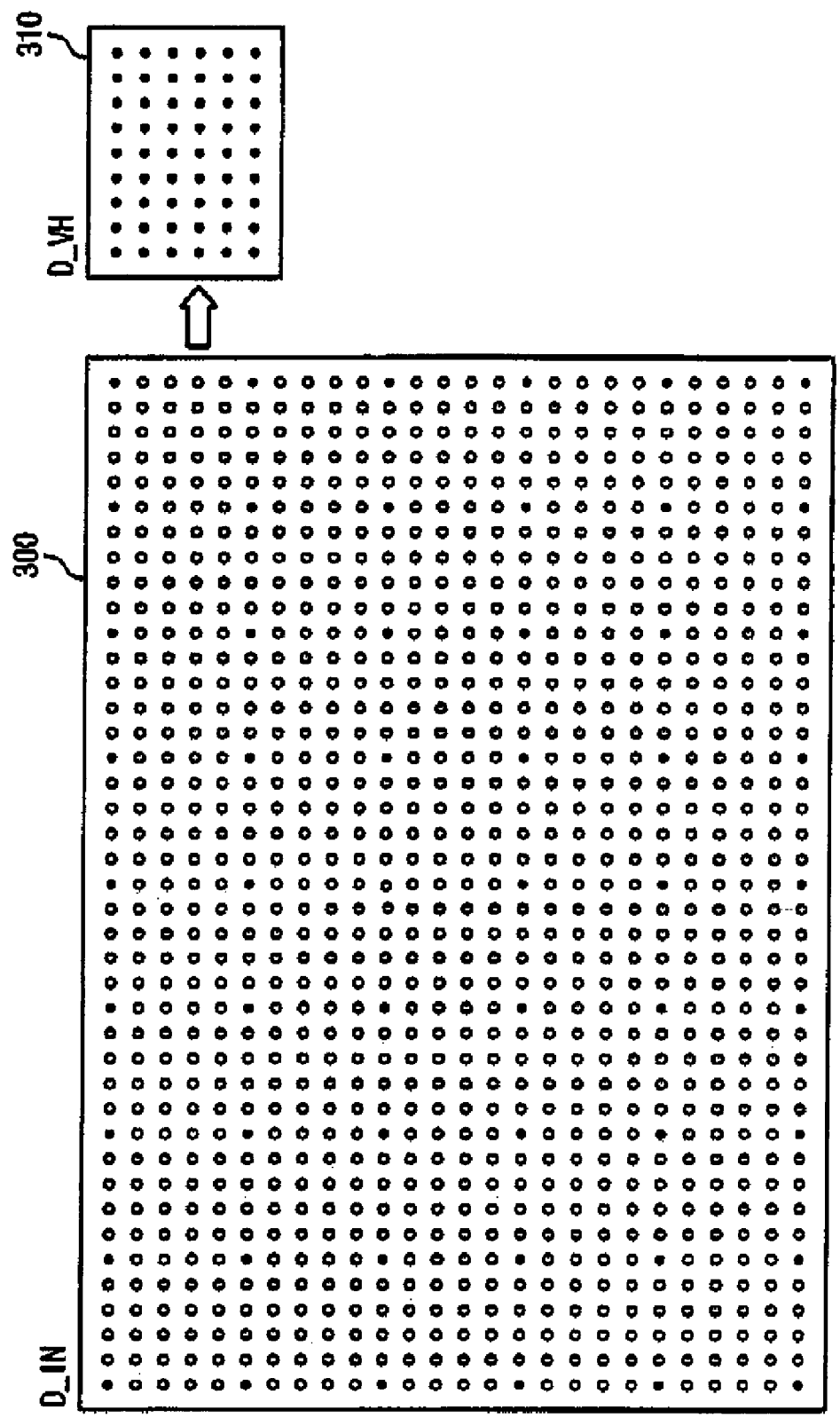
FIG. 3 is a conceptual view illustrating an image signal input to the image reducing unit of FIG. 2 and a second reduction image signal output from the image reducing unit.

FIG. 3 is a conceptual view illustrating an exemplary image signal D_IN 300 input to the image reducing unit 110 of FIG. 1, and a corresponding second reduction image signal D_VH 310 output from the image reducing unit 110. When the resolution is m×n, for example, one frame includes image signals corresponding to m pixels in the horizontal direction and image signals corresponding to n pixels in the vertical direction. When the vertical reduction ratio DR_V is 4 and the horizontal reduction ratio DR_H is 4, the second reduction image signal D_VH 310 output from the image reducing unit 110 has a resolution of m/4×n/4.

At this point, the counter 212 within the vertical selector 210 of FIG. 2 operates in synchronization with the vertical synchronization signal V_SYNC. The vertical selector 210 outputs a first reduction image signal D_V whenever a count value of the counter 212 is a multiple of the vertical reduction ratio DR_V, that is, 0, 4, 8, 12, . . . . Likewise, the counter 222 within the horizontal selector 220 operates in synchronization with the horizontal synchronization signal H_SYNC. The horizontal selector 220 outputs a second reduction image signal D_VH whenever a count value of the counter 222 is a multiple of the horizontal reduction ratio DR_H, that is, 0, 4, 8, 12, . . . . Therefore, in the depicted example, the resolution of the second reduction image signal D_VH belonging to one frame and output from the image reducing unit 110 is reduced by one sixteenth, compared to the resolution of the corresponding input image signal D_V.

Figure 4:
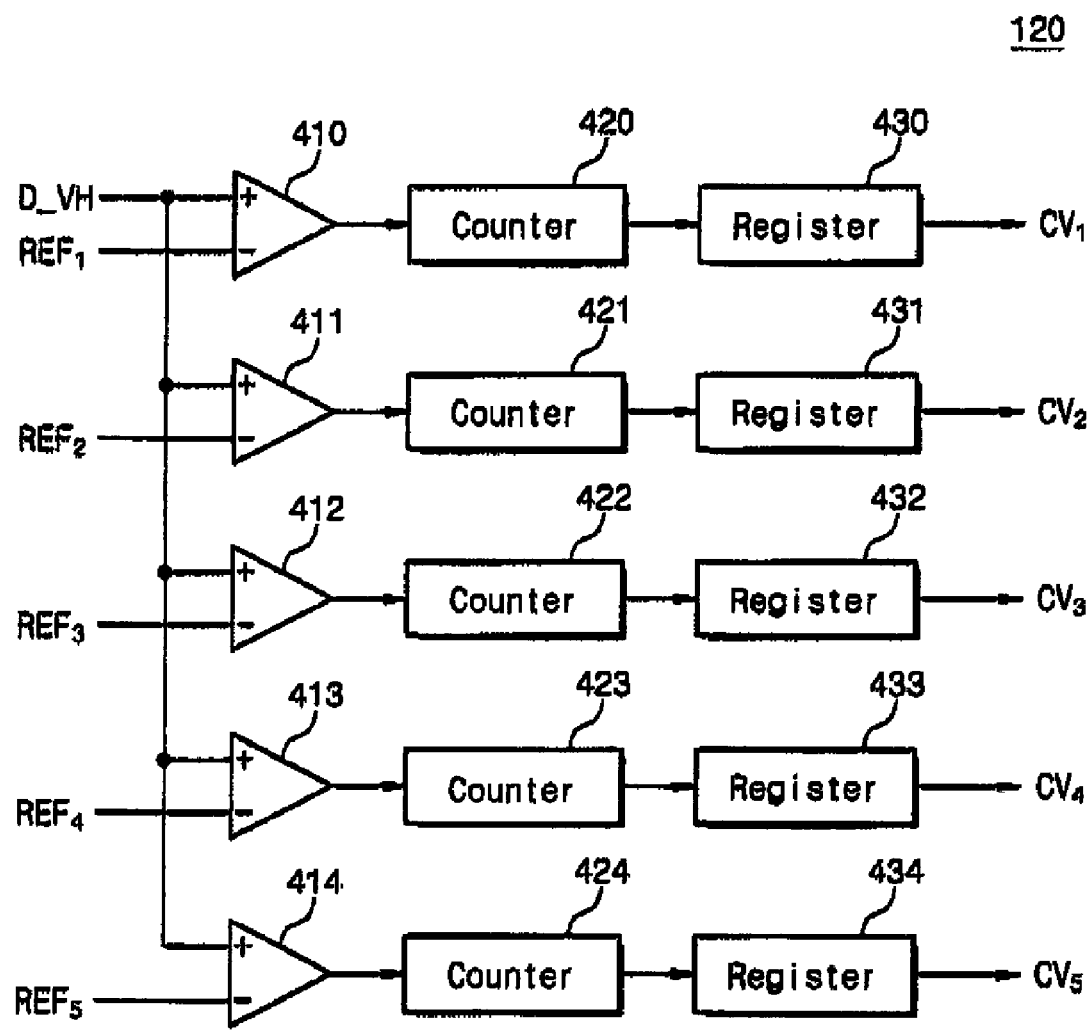
FIG. 4 is a block diagram illustrating an accumulation value calculating unit of the contrast control apparatus illustrated in FIG. 1.

FIG. 4 is a block diagram illustrating a more detailed construction of the accumulation value calculating unit 120 illustrated in FIG. 1. The accumulation value calculating unit 120 includes comparators 410-414, counters 420-424, and registers 430-434. The comparators 410-414 receive the second reduction image signal D_VH output from the image reducing unit 110, and corresponding reference values $REF_1$-$REF_5$, respectively. The counters 420-424 are respectively connected to output terminals of the comparators 410-414. The counters 420-424 increase a count value by one whenever a low level signal is output from the corresponding comparators 410-414. The registers 430-434 correspond to the counters 420-424, and store count values output from the corresponding counters, respectively.

When the second reduction image signal D_VH is an 8-bit signal, for example, the second reduction image signal D_VH can express 256 levels ranging from gray value 0 to gray value 255. The reference values $REF_1$-$REF_5$ provided to the comparators 410-414 are sampling gray values for classifying the second reduction image signals D_VH into predetermined gray value groups. Examples of reference values provided to the comparators 410-414 include 16, 64, 128, 192 and 255. For example, when the second reduction image signal D_VH is a signal having a corresponding gray value of "120," the comparators 410-412 output a high level comparison signal, and the comparators 413-414 output a low level comparison signal.

When the second reduction image signals D_VH are classified into predetermined sampling gray value groups, the count values stored in the registers 430-434 indicate the number of second reduction image signals D_VH contained in each respective sampling gray value group, indicated as accumulation values $CV_1$-$CV_5$. The accumulation values $CV_1$-$CV_5$ are provided to the image characteristic decision unit 130.

Figure 5:
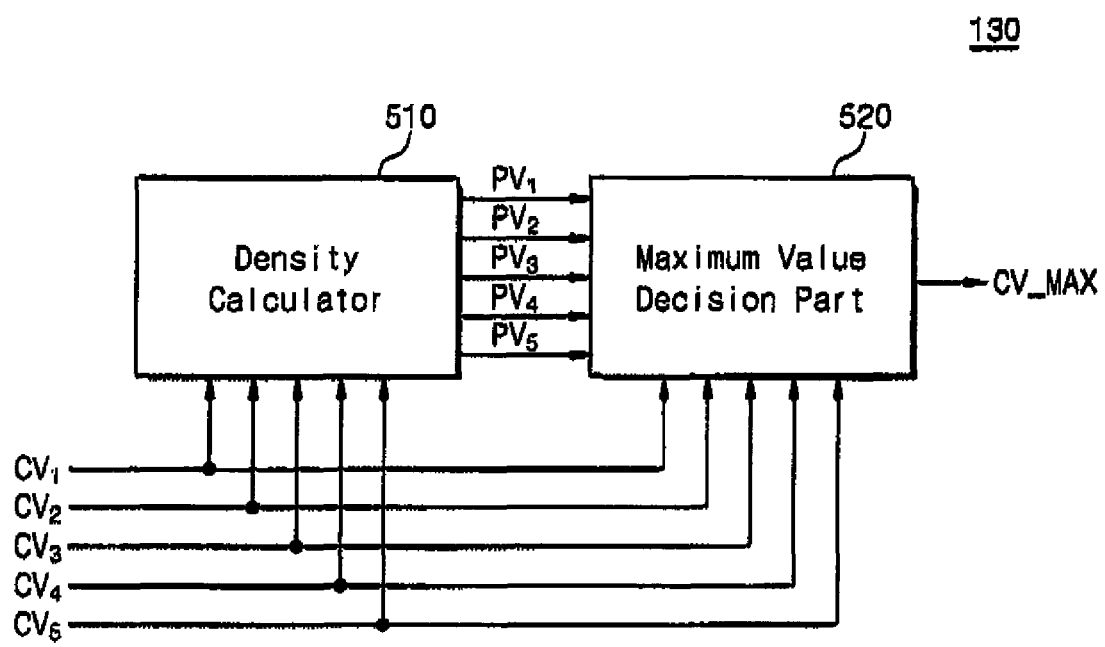
FIG. 5 is a block diagram illustrating an image characteristic deciding unit of the contrast control apparatus illustrated in FIG. 1.

FIG. 5 is a block diagram illustrating a more detailed construction of the image characteristic deciding unit 130 illustrated in FIG. 1. Referring to FIG. 5, the image characteristic decision unit 130 includes a density calculator 510 and a maximum value decision part 520. The density calculator 510 calculates densities $PV_k$, which are differences between adjacent accumulation values output by the accumulation value calculating unit 120. The density $PV_k$ is calculated using Equation 1:

$$PV_k = CV_k - CV_{k-1} \qquad \text{(Equation 1)}$$

Applying Equation 1 to the embodiment illustrated in FIG. 4, for example, k is one of 1, 2, 3, . . . , l, where l is the total number of sampling gray values. In the present embodiment, k is one of 1, 2, 3, 4 or 5 and corresponds to each sampling gray value $REF_1$-$REF_5$. $CV_1$-$CV_5$ are the gray values provided by the accumulation value calculating unit 120, and $CV_0$ (i.e., $CV_{k-1}$, when k=1) is zero. Accordingly, $PV_1$ is the difference between the accumulation value $CV_1$ corresponding to gray value 16 and zero, and $PV_2$ is the difference between the accumulation value $CV_2$, corresponding to gray value 64, and the accumulation value $CV_1$, corresponding to gray value 16.

The maximum value decision part 520 of the image characteristic decision unit 130 determines the largest density of the densities $PV_1$-$PV_5$ output from the density calculator 510, and outputs an image characteristic accumulation value CV_MAX, which is the accumulation value corresponding to the largest density. For example, when the density $PV_4$ is the largest among of the densities $PV_1$-$PV_5$, the accumulation value $CV_4$ is selected as the image characteristic accumulation value CV_MAX. The contrast control function calculator 140 calculates a contrast control function f'(x) on the basis of the image characteristic accumulation value CV_MAX provided by the image characteristic decision unit 130.

Figure 6A:
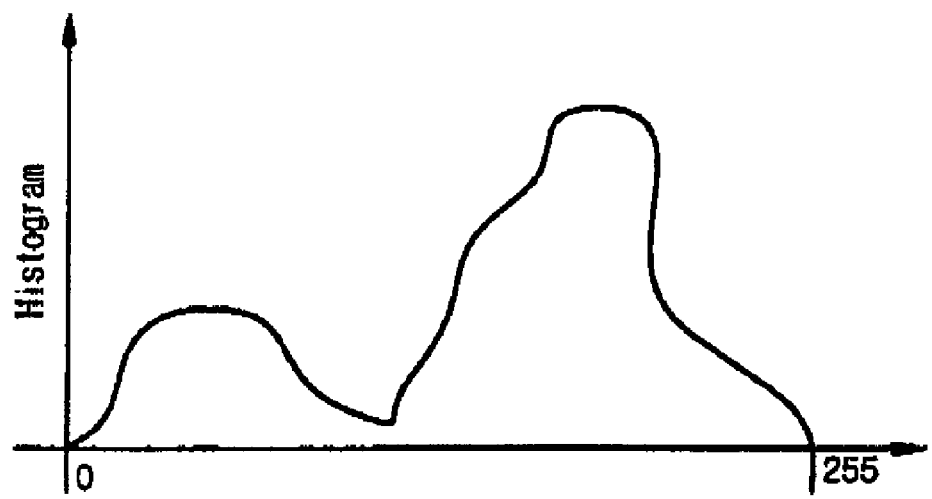
FIG. 6A is a histogram of a second reduction image signal output from an image reducing unit, according to an exemplary embodiment of the present invention.
Figure 6B:
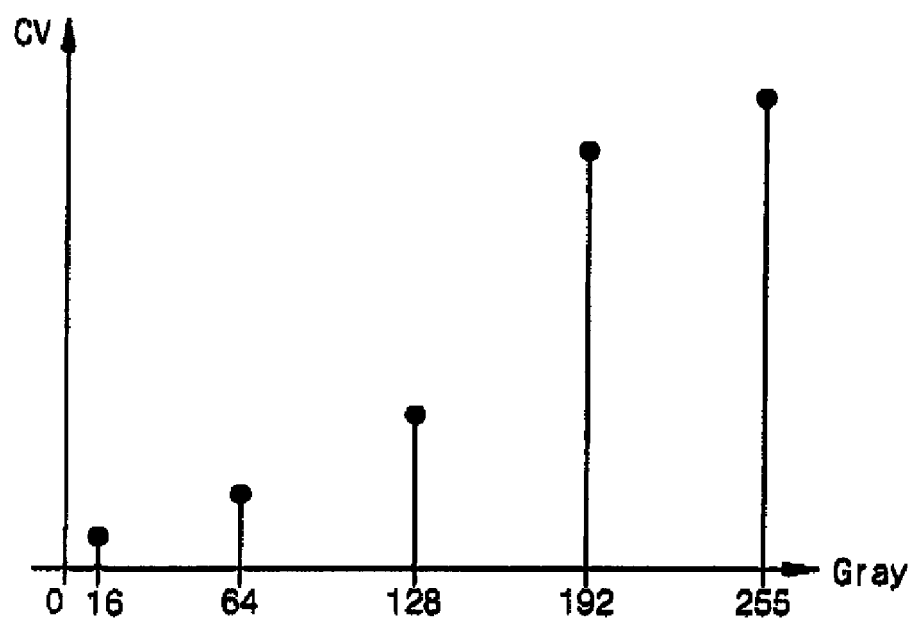
FIG. 6B is an accumulation distribution diagram illustrating accumulation values obtained by accumulating second reduction image signals of FIG. 6A with respect to each of predetermined sampling grays, according to an exemplary embodiment of the present invention.
Figure 6C:
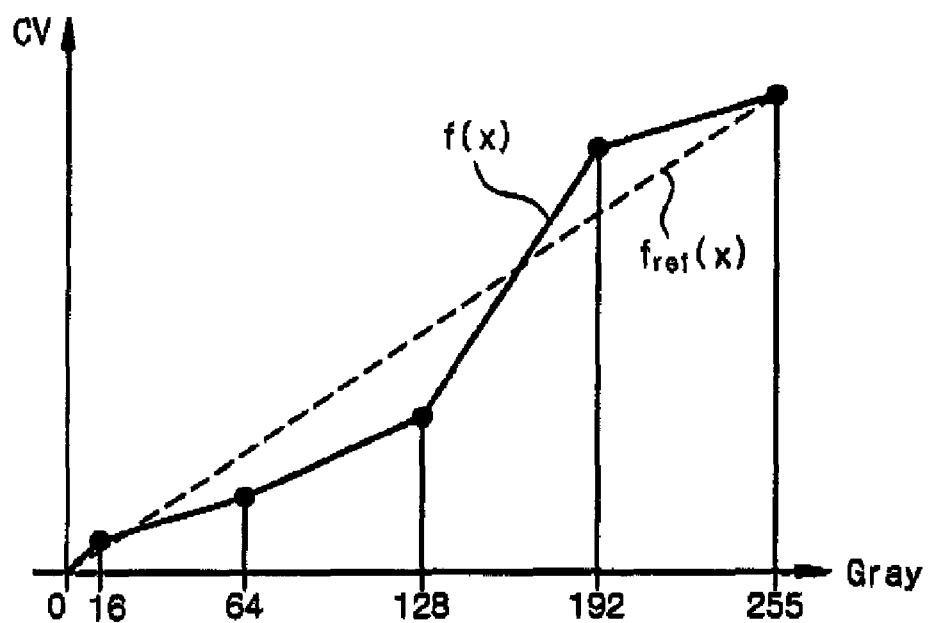
FIG. 6C is a view illustrating an accumulation distribution function for accumulation values illustrated in FIG. 6B using a linear interpolation method, according to an exemplary embodiment of the present invention.

FIG. 6A is a histogram of an exemplary second reduction image signal D_VH output from the image reducing unit 110. FIG. 6B is an accumulated distribution diagram illustrating accumulation values (e.g., $CV_1$-$CV_6$) obtained by accumulating the second reduction image signals D_VH of FIG. 6A with respect to each of the predetermined sampling gray values. An accumulation distribution function f(x) for the accumulation values illustrated in FIG. 6B is obtained using linear interpolation, as illustrated in FIG. 6C, for example.

The slopes of the accumulation distribution function f(x) between adjacent sampling gray values may be different from each other. Equation 2 represents an equation for obtaining a slope $\alpha_k$ between adjacent sampling gray values to calculate the accumulation distribution function f(x):

$$\alpha_k = \frac{CV_k - CV_{k-1}}{REF_k - REF_{k-1}} \qquad \text{(Equation 2)}$$

In Equation 2, k is one of 1, 2, 3, 4 or 5, corresponding to the sampling gray values, respectively, $CV_k$ are accumulation values and $REF_k$ are reference values, as discussed above. $REF_0$ is 0, and $CV_0$ is 0.

The equation for obtaining the accumulation distribution function f(x) illustrated in FIG. 6C is provided by Equation 3:

$$f(x)=\alpha_k(x-REF_k)+CV_k, REF_k \leq x \leq REF_{k+1} \qquad \text{(Equation 3)}$$

In Equation 3, x is a gray value of the second reduction image signal D_HV.

Figure 6D:
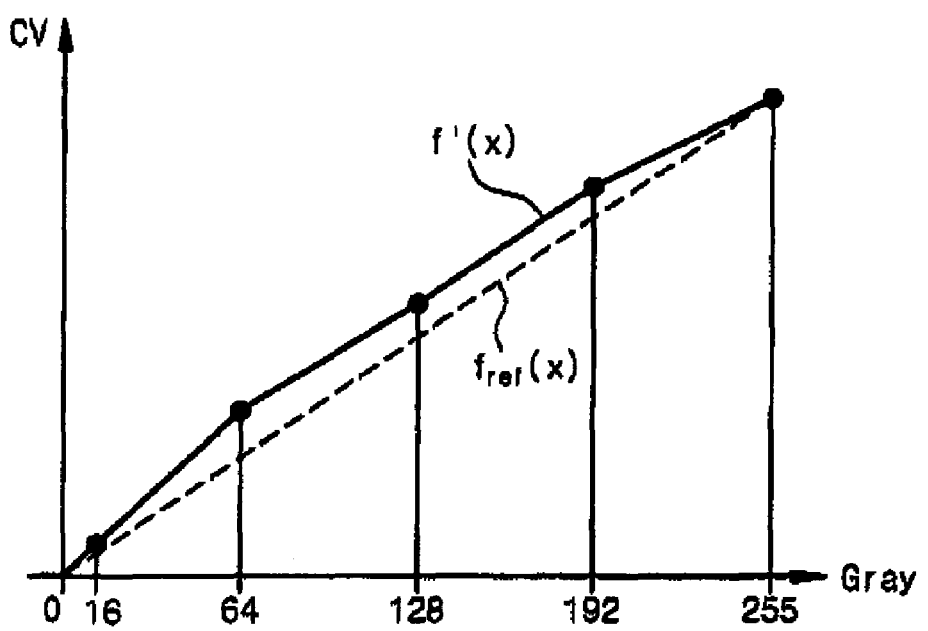
FIG. 6D is a view illustrating a contrast control function obtained by a contrast control function calculating unit within a contrast control apparatus, according to an exemplary embodiment of the present invention.

FIG. 6D is a view illustrating an exemplary contrast control function f'(x), which is a mapping function obtained by the contrast control function calculating unit 140 within the contrast control apparatus 100, according to an embodiment of the present invention. Referring to FIG. 6D, an ideal image has a reference function $f_{ref}(x)$ characteristic according to which image signals having various brightnesses are uniformly distributed, so that the gray values are proportional to the accumulation values. However, a real image typically has a distribution according to which image signals having various brightnesses may be irregularly distributed, or many image signals having predetermined brightnesses an be represented as illustrated in FIG. 6C.

In the example depicted in FIG. 6C, the difference between the accumulation value $CV_3$ corresponding to gray value 128 and the accumulation value $CV_4$ corresponding to gray value 192 is large, indicating that many of the image signals have relatively bright brightnesses. That is, a density $PV_4$ has the largest value. In this case, a brightness of the image signals corresponding to a relatively dark brightness is controlled to be brighter and a brightness of the image signals corresponding to a relatively bright brightness is controlled to be darker, improving the contrast of the image.

As described above, the contrast of an input image can be improved by determining a characteristic of the input image and obtaining a contrast control function according to the determined characteristic of the input image. Equation 4 below is an equation for obtaining a controlled slope α' to obtain a contrast control function:

$$\alpha_{k'} = \frac{CV_{k'} - CV_{k-1'}}{REF_k - REF_{k-1}} \qquad \text{(Equation 4)}$$

A controlled accumulation value $CV_{k'}$ of Equation 4 is obtained using Equation 5 below:

$$CV_{k'}=CV_k \pm W$$

where $W=\beta|CV\_MAX-REF\_MAX|$ (Equation 5)

In Equation 5, k'=1, 2, 3, 4 or 5, and β is a proportional constant where $0 \leq \beta \leq 1$. REF_MAX is a value corresponding to an image characteristic CV_MAX, i.e., $f_{ref}$(CV_MAX), in a reference function $f_{ref}(x)$, which is an ideal image function, as illustrated in FIG. 6D. Controlled accumulation values $CV_1$-$CV_5$, can be obtained by adding or subtracting a compensation value W to or from accumulation values $CV_1$-$CV_5$, respectively. The compensation value W is proportional to a difference between the image characteristic value (CV_MAX) and a reference value (REF_MAX) of the reference function that corresponds to the image characteristic value.

More particularly, controlled accumulation values $CV_{k'}$ are obtained by subtracting a compensation value W from an accumulation value $CV_k$ (i.e., $CV_k$-W) when the accumulation value $CV_k$ corresponding to sampling gray value $REF_k$ is greater than an accumulation value in a reference function $f_{ref}$(k). On the other hand, controlled accumulation values $CV_{k'}$ can be obtained by adding the compensation value W to the accumulation value $CV_k$ (i.e., $CV_k$+W) when the accumulation value $CV_k$ corresponding to sampling gray value $REF_k$ is smaller than the accumulation value in a reference function $f_{ref}$(k).

A contrast control function f'(x) can be calculated using Equation. 6, according to a controlled slope α' obtained by Equation 4:

$$f'(x)=\alpha_{k'}(x-REF_k)+CV_{k'}, REF_k \leq x \leq REF_{k+1} \qquad \text{(Equation 6)}$$

Comparison of FIG. 6C with FIG. 6D shows that the accumulation distribution function f(x) illustrated in FIG. 6C has been changed to a contrast control function f'(x) illustrated in FIG. 6D, which is closer to the reference function $f_{ref}(x)$, thus approximating the reference function $f_{ref}(x)$.

The function f'(x), obtained by the contrast control function calculating unit 140, is provided to a contrast control unit 160. The contrast control unit 160 converts the input image signals D_IN stored in the memory 150 to output image signals DOUT, using the contrast control function f'(x).

The contrast control apparatus 100 according to the present embodiment extracts some of the image signals D_IN belonging to one frame to obtain second reduction image signals D_VH, as discussed above. Because a contrast control function f'(x) can be calculated on the basis of fewer than all of the image signals within the frame, the time required for calculating the contrast control function f'(x) is shortened. Therefore, the contrast control function f'(x) can be calculated in real-time with respect to input image signals D_IN.

The accumulation value calculating unit 120 of FIG. 4 calculates accumulation values using predetermined sampling gray values, instead of calculating accumulation values for all gray values (e.g., 256 gray values) corresponding to the number of bits of an image signal. Therefore, because the accumulation value calculating unit 120 requires only a minimum number of the comparators 410-414, counters 420-424 and registers 430-434, a circuit area is reduced.

Referring to FIGS. 6C and 6D, because accumulation values for the remaining gray values, located between sampling gray values, can be obtained using linear interpolation, the number of operations required for calculating accumulation values corresponding to the remaining gray values is not very large.

Because the contrast control function f'(x) can be obtained to approximate the reference function $f_{ref}(x)$, the contrast of an image is improved. Also, the reference function $f_{ref}(x)$ and β required for obtaining the contrast control function f'(x) can be set by a user to express an optimum image.

FIG. 7 is a flowchart illustrating a method for controlling contrast according to an exemplary embodiment of the present invention.

Referring to FIG. 7, a reduction image signal D_VH corresponding to an original input signal D_IN is input in operation 700. When the input image signal D_IN has resolution of m×n, one frame includes image signals corresponding to m pixels in the horizontal direction and image signals corresponding to n pixels in the vertical direction. When a vertical reduction ratio is DR_V is 4 and a horizontal reduction ratio DR_H is 4, for example, a corresponding second reduction image signal D_VH has resolution of m/4×n/4.

Accumulation values for predetermined sampling gray values are obtained in operation 710. For example, when the bit width of an input signal D_IN is 8 bits, accumulation values corresponding to five sampling gray values of 16, 64, 128, 192 and 255 in total can be obtained.

In operation 720, a characteristic of the image is determined based on accumulation values corresponding to reference sampling gray values. For example, an accumulation value having the largest difference between itself and an adjacent accumulation value indicates that the image contains a large number of the corresponding sampling gray value. It is therefore considered that the accumulation value having the largest difference between itself and an adjacent accumulation value best represents the characteristic of the image, and thus that accumulation value is selected as an image characteristic accumulation value CV_MAX.

The contrast control function f'(x) is obtained on the basis of the image characteristic accumulation value CV_MAX in operation 730. The contrast of input image signal D_IN is controlled according to the contrast control function f'(x) in operation 740.

According to the present invention, a contrast control function can be obtained through a minimum number of operations. Also, since the contrast control function can be varied depending on a characteristic of an image, image quality improves.

While the present invention has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A contrast control apparatus comprising:
    a memory for storing a plurality of input image signals within one frame;
    an image reducing unit for selecting at least one image signal of the input image signals;
    an accumulation value calculator for calculating accumulation values for predetermined sampling gray values with respect to the at least one selected image signal;
    an image characteristic decision unit for determining at least one characteristic of the at least one selected image signal based on the accumulation values;
    a contrast control function calculator for calculating a contrast control function based on the at least one determined characteristic of the at least one selected image signal; and
    a contrast controller for controlling contrast of the plurality of image signals stored in the memory according to the contrast control function.

2. The apparatus of claim 1, wherein the image reducing unit comprises:
    a vertical selector for selecting image signals of the plurality of input image signals in a vertical direction, corresponding to a vertical reduction ratio, as first reduction image signals; and
    a horizontal selector for selecting image signals output from the vertical selector in a horizontal direction, corresponding to a horizontal reduction ratio, as second reduction image signals.

3. The apparatus of claim 2, wherein the vertical selector comprises a first counter operating in synchronization with a vertical synchronization signal, wherein the vertical selector outputs the first reduction image signals when a count value of the first counter is a multiple of the vertical reduction ratio.

4. The apparatus of claim 3, wherein the horizontal selector comprises a second counter operating in synchronization with a horizontal synchronization signal, wherein the horizontal selector outputs the second reduction image signals when a count value of the second counter is a multiple of the horizontal reduction ratio.

5. The apparatus of claim 2, wherein the accumulation value calculator comprises:
    a plurality of comparators for receiving a corresponding plurality of reference signals, each comparator comparing the corresponding reference signal with the at least one image signal and outputting a comparison signal; and
    a plurality of counters corresponding to the plurality of comparators, each counter operating in response to the comparison signal from the corresponding comparator, and outputting an accumulation value.

6. The apparatus of claim 5, wherein each of the plurality of reference signals comprises a sampling gray value.

7. The apparatus of claim 6, wherein each of the plurality of counters performs a counting operation when the comparison signal output from the corresponding comparator is a first level.

8. The apparatus of claim 6, wherein the image characteristic decision unit determines an image characteristic accumulation value by identifying a largest difference between adjacent accumulation values output from the corresponding plurality of counters.

9. The apparatus of claim 6, wherein the image characteristic decision unit comprises:
    a density calculator for calculating differences between adjacent accumulation values output from the plurality of counters; and
    a maximum value decision part for outputting a maximum accumulation value corresponding to a largest difference among the differences between adjacent accumulation values as an image characteristic accumulation value.

10. The apparatus of claim 9, wherein the contrast control function calculator calculates a contrast control function based on the image characteristic accumulation value, the contrast control function approximating a reference function.

11. The apparatus of claim 10, wherein the reference function comprises a reference accumulation value change function with respect to a gray change for displaying an optimum image.

12. The apparatus of claim 11, wherein the contrast control function calculator unit adds or subtracts a compensation value to or from each accumulation value to calculate controlled accumulation values, and calculates the contrast control function based on the controlled accumulation values.

13. The apparatus of claim 12, wherein the contrast control function calculator subtracts the compensation value from the accumulation value when the accumulation value corresponding to the sampling gray value is greater than the reference accumulation value corresponding to the sampling gray value, and adds the compensation value to the accumulation value when the accumulation value corresponding to the sampling gray value is less than the reference accumulation value corresponding to the sampling gray value.

14. The apparatus of claim 12, wherein the compensation value is proportional to a difference between the image characteristic accumulation value and a reference accumulation value corresponding to the image characteristic accumulation value.

15. The apparatus of claim 14, wherein the compensation value comprises a product of a proportional constant and the difference between the image characteristic accumulation value and the reference accumulation value corresponding to the image characteristic accumulation value.

16. The apparatus of claim 15, wherein the proportional constant comprises a number greater than 0 and less than 1.

17. The apparatus of claim 11, wherein the contrast control function f'(x) is provided by:

$$f(x) = \alpha_{k'}(x - REF_k) + CV_{k'}$$

here $\alpha_{k'}$ is a slope, x is an input image signal, k is one of 1, 2, 3, . . . , l where l is a number of the sampling gray values, $CV_{k'}$ is a controlled accumulation value, and $REF_k$ is a reference sampling gray value where $REF_k \leq x \leq REF_{k+1}$.

18. The apparatus of claim 17, wherein the slope $\alpha_{k'}$ is provided by $$\alpha_{k'} = \frac{CV_{k'} - CV_{k-1'}}{REF_k - REF_{k-1}}$$

where the controlled accumulation values $CV_{k'}$ are calculated by one of adding or subtracting a compensation value W to or from accumulation values $CV_k$.

19. The apparatus of claim 18, wherein the contrast control function calculator subtracts the compensation value from the accumulation value when the accumulation value corresponding to the sampling gray value is greater than the reference accumulation value corresponding to the sampling gray value, and adds the compensation value to the accumulation value when the accumulation value corresponding to the sampling gray value is less than the reference accumulation value corresponding to the sampling gray value.

20. The apparatus of claim 18, wherein the compensation value is a product of a proportional constant and a difference between the image characteristic accumulation value and a reference accumulation value corresponding to the image characteristic accumulation value.

21. A method for controlling contrast of an image, the method comprising:
selecting image signals within one frame of the image to provide reduction image signals;
calculating accumulation values corresponding to sampling gray values set in advance with respect to the reduction image signals;
determining characteristics of the image signals based on the accumulation values and selecting an image characteristic accumulation value;
calculating a contrast control function based on the selected image characteristic accumulation value; and
controlling contrast of all image signals within the one frame according to the contrast control function.

22. The method of claim 21, wherein selecting the image signals within one frame comprises selecting image signals at predetermined positions within the one frame as the reduction image signals.

23. The method of claim 21, wherein providing the reduction image signals comprises:
selecting at least one image signal within the one frame corresponding to a vertical reduction ratio as first reduction image signals; and
selecting the first reduction image signals corresponding to a horizontal reduction ratio as second reduction signals.

24. The method of claim 23, wherein selecting the image characteristic accumulation value comprises selecting an accumulation value of the calculated accumulation values that has a largest difference between an adjacent accumulation value.

25. The method of claim 24, wherein calculating the contrast control function comprises approximating a reference function based on the image characteristic accumulation value.

26. The method of claim 25, wherein the reference function comprises is a reference accumulation value change function with respect to a gray change for displaying an optimum image.

27. The method of claim 24, wherein calculating the contrast control function comprises adding or subtracting a compensation value to or from each of the calculated accumulation values to calculate controlled accumulation values, the contrast control function being based on the controlled accumulation values.

28. The method of claim 27, wherein adding or subtracting the compensation value to or from each of the calculated accumulation values comprises:
subtracting the compensation value from each accumulation value corresponding to a sampling gray value that is greater than a reference accumulation value corresponding to the sampling gray value; and
adding the compensation value to each accumulation value corresponding to a sampling gray value that is less than a reference accumulation value corresponding to the sampling gray value.

29. The method of claim 28, wherein the compensation value is proportional to a difference between the image characteristic accumulation value and a reference accumulation value corresponding to the image characteristic accumulation value.

30. The method of claim 29, wherein the compensation value comprises is a product of a proportional constant and the difference between the image characteristic accumulation value and the reference accumulation value corresponding to the image characteristic accumulation value.

31. The method of claim 30, wherein the proportional constant comprises a number greater than 0 and less than 1.

* * * * *